United States Patent
Pakzad et al.

(10) Patent No.: US 7,912,666 B1
(45) Date of Patent: Mar. 22, 2011

(54) DISK DRIVE GROUPING IN A MULTI-CELL DISK DRIVE TEST SYSTEM

(75) Inventors: Mostafa Pakzad, Palos Verdes Peninsula, CA (US); Peter Cheok Him Pang, Rancho Santa Margarita, CA (US); Mohammad R. Bahadori, Irvine, CA (US); Joseph M. Viglione, Laguna Hills, CA (US); Roma Leang, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 633 days.

(21) Appl. No.: 11/287,723

(22) Filed: Nov. 28, 2005

(51) Int. Cl.
*G06F 11/26* (2006.01)
*G06F 11/273* (2006.01)

(52) U.S. Cl. ............ 702/115; 702/108; 714/25; 714/742

(58) Field of Classification Search .................... 702/115
See application file for complete search history.

(56) References Cited

U.S. PATENT DOCUMENTS

| | | | |
|---|---|---|---|
| 4,348,761 A | 9/1982 | Berger | |
| 5,469,361 A | 11/1995 | Moyne | |
| 6,104,985 A * | 8/2000 | Sowards | 702/117 |
| 6,169,413 B1 * | 1/2001 | Paek et al. | 324/760 |
| 6,278,959 B1 | 8/2001 | Alferness | |
| 6,321,352 B1 * | 11/2001 | Wasson | 714/724 |
| 6,327,150 B1 * | 12/2001 | Levy et al. | 361/724 |
| 6,467,153 B2 * | 10/2002 | Butts et al. | 29/603.03 |
| 6,505,281 B1 | 1/2003 | Sherry | |
| 6,651,192 B1 * | 11/2003 | Viglione et al. | 714/47 |
| 6,865,514 B1 | 3/2005 | Goguen et al. | |
| 6,897,393 B1 * | 5/2005 | Codilian et al. | 209/571 |
| 7,076,391 B1 * | 7/2006 | Pakzad et al. | 702/118 |
| 7,136,768 B1 * | 11/2006 | Shah et al. | 702/115 |
| 2004/0068330 A1 | 4/2004 | White | |
| 2004/0088696 A1 | 5/2004 | Kawano et al. | |
| 2004/0193295 A1 | 9/2004 | Kaneko | |
| 2005/0203645 A1 | 9/2005 | Klopfer et al. | |

OTHER PUBLICATIONS

U.S. Appl. No. 11/190,281 "Multi-Drive Adaptor for Use in a Slot of a Disk Drive Test System," Pakzad et al.
"Automated Production Test Solutions" Xyratex Corporation, 6 pages.
Office Action dated Feb. 10, 2006 from U.S. Appl. No. 10/286,146, 7 pages.
Office Action dated May 5, 2006 from U.S. Appl. No. 10/286,146, 7 pages.
Office Action dated Jul. 23, 2008 from U.S. Appl. No. 11/353,352, 16 pages.
Office Action dated Feb. 4, 2009 from U.S. Appl. No. 11/353,352, 11 pages.
Notice of Allowance dated Jun. 8, 2009 from U.S. Appl. No. 11/353,352, 11 pages.
Zunzanyika, et al., "Simultaneous Development & Qualification in the Fast-Changing 3.5" Hard-Disk-Drive Technology, 1995 Proceedings Annual Reliability and Maintainability Symposium, pp. 27-32.

* cited by examiner

*Primary Examiner* — Hal D Wachsman

(57) ABSTRACT

Disclosed is a system and method for disk drive grouping in a multi-cell disk drive test system. A test platform includes a plurality of cells. Each cell is configured to receive and to provide communication with a disk drive. An automated loader/unloader is coupled to a test computer and is responsive to the test computer. The automated loader/unloader is configured to identify disk drives and to selectively load and unload disk drives into and out of the plurality of cells. Particularly, once the automated loader/unloader has identified a first disk drive, the test computer is configured to: determine a grouping criteria based upon the first disk drive; detect a subsequent disk drive having the same grouping criteria as the first disk drive; and cause the automated loader/unloader to load the subsequent disk drive into one of the plurality of cells.

14 Claims, 8 Drawing Sheets

GROUPING CRITERIA EXAMPLES

600 ⟶

| PRODUCT ATTRIBUTE | PROCESS ATTRIBUTE |
|---|---|
| CACHE BUFFER SIZE | OPERATION TYPE |
| NUMBER OF HEADS | CUSTOMER |
| FAMILY ID | SOFTWARE MODULE |
| CAPACITY | SOFTWARE VERSION |
| RPM | |
| INTERFACE PROTOCOL | |

602 — PRODUCT ATTRIBUTE
604 — CACHE BUFFER SIZE
606 — NUMBER OF HEADS
608 — FAMILY ID
610 — CAPACITY
612 — RPM
614 — INTERFACE PROTOCOL

603 — PROCESS ATTRIBUTE
620 — OPERATION TYPE
624 — CUSTOMER
626 — SOFTWARE MODULE
628 — SOFTWARE VERSION

FIG. 6

DISK DRIVE GROUPING IN A MULTI-CELL DISK DRIVE TEST SYSTEM

BACKGROUND

1. Field of the Invention

The present invention relates to a system and method for disk drive grouping in a multi-cell disk drive test system used to test disk drives.

2. Description of the Prior Art and Related Information

FIG. 1 shows the principal components of an example of a magnetic disk drive 100 that may be tested in a multi-cell disk drive testing system. With reference to FIG. 1, the disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the head stack assembly (HSA) 120 on the base 116. The spindle motor 113 rotates the disk stack 123 at a constant angular velocity.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159.

The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises body portion 140 that rotates on the pivot bearing 184 cartridge between limited positions, coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

After the HDA 144 and the PCBA 114 are mated, the disk drive typically undergoes a variety of tests and procedures to configure and validate the proper operation of the disk drive. Such testing is conventionally carried out in a multi-cell disk drive test platform that includes a bank of cells into which the disk drives are loaded and unloaded such that a sequential series of tests and procedures can be administered to the loaded disk drives. Some of the tests and procedures are subject to strict environmental control requirements.

Because disk drive testers and disk drive testing represent such large expenditures for disk drive manufacturers, more efficient testers and testing procedures are continuously sought after in order to reduce inefficiencies and costs and to increase disk drive throughput. One particular source of inefficiency associated with conventional multi-cell disk drive test systems is that multiple cells are often tested together and disk drives with different characteristics in these cells may take differing amounts of time to complete the tests. Thus, the throughput of these multiple cells is limited to the time it takes the slowest disk drive to complete the testing.

SUMMARY

The present invention relates to a system and method for disk drive grouping in a multi-cell disk drive test system used to test disk drives.

In one embodiment of the present invention, a multi-cell disk drive test system comprises a test platform, a test computer, and an automated loader/unloader. The test platform includes a plurality of cells in which each cell is configured to receive and to provide communication with a disk drive. The automated loader/unloader is coupled to the test computer and is responsive to the test computer. The automated loader/unloader is configured to identify disk drives and to selectively load and unload disk drives into and out of the plurality of cells. Particularly, once the automated loader/unloader has identified a first disk drive, the test computer is configured to: determine a grouping criteria based upon the first disk drive; detect a subsequent disk drive having the same grouping criteria as the first disk drive; and cause the automated loader/unloader to load the subsequent disk drive into one of the plurality of cells.

In another embodiment of the present invention, a method for providing disk drive grouping in a multi-cell disk drive test system is disclosed. The multi-cell disk drive test system includes a test platform having a plurality of cells in which each cell is configured to receive and to provide communication with a disk drive such that at least one of a plurality of test steps are administered to the disk drive. The method comprises: identifying a first disk drive; determining a grouping criteria based upon the first disk drive; loading the first disk drive into a cell; detecting a subsequent disk drive that is identified as having the same grouping criteria as the first disk drive; loading the subsequent disk drive; and administering at least one test step to the first and subsequent disk drives having the same grouping criteria.

In yet another embodiment of the present invention, a multi-cell disk drive test system used for testing a plurality of disk drives is disclosed, in which the multi-cell disk drive test system includes a test platform having a plurality of cells, wherein each cell is configured to receive and to provide communication with a disk drive such that at least one of a plurality of test steps are administered to the disk drive. A computer-readable medium is also disclosed, the medium having stored thereon instructions, which, when executed by a computer, cause the computer to perform operations comprising: identifying a first disk drive; determining a grouping criteria based upon the first disk drive; and detecting a subsequent disk drive having the same grouping criteria as the first disk drive.

The foregoing and other features of the invention are described in detail below and are set forth in the appended claims.

BRIEF DESCRIPTION OF THE DRAWINGS

FIG. 6 is a table illustrating examples of different types of grouping criteria based on product attributes or process attributes.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
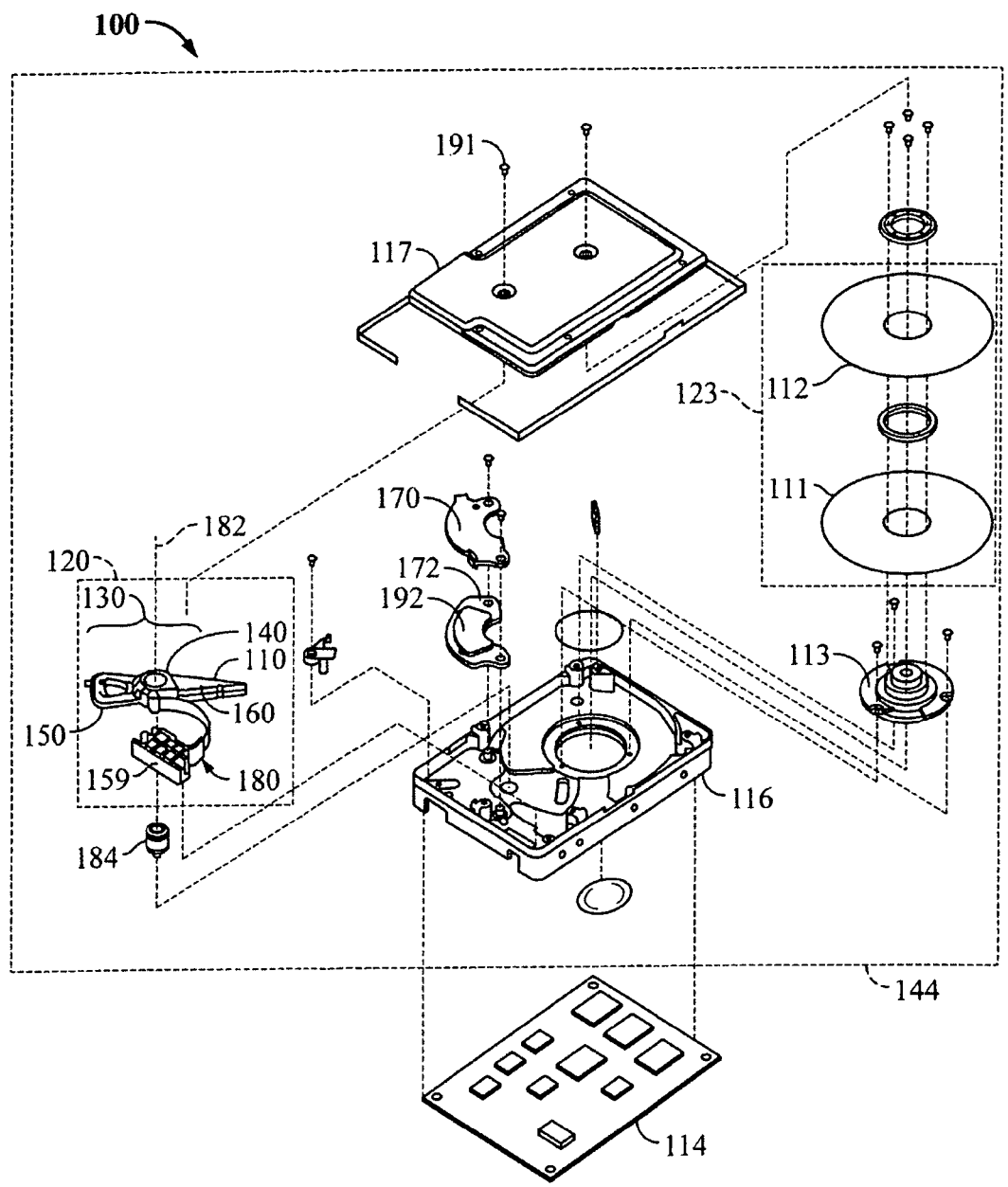
FIG. 1 is a prior art diagram of the basic components of a disk drive.
Figure 2:
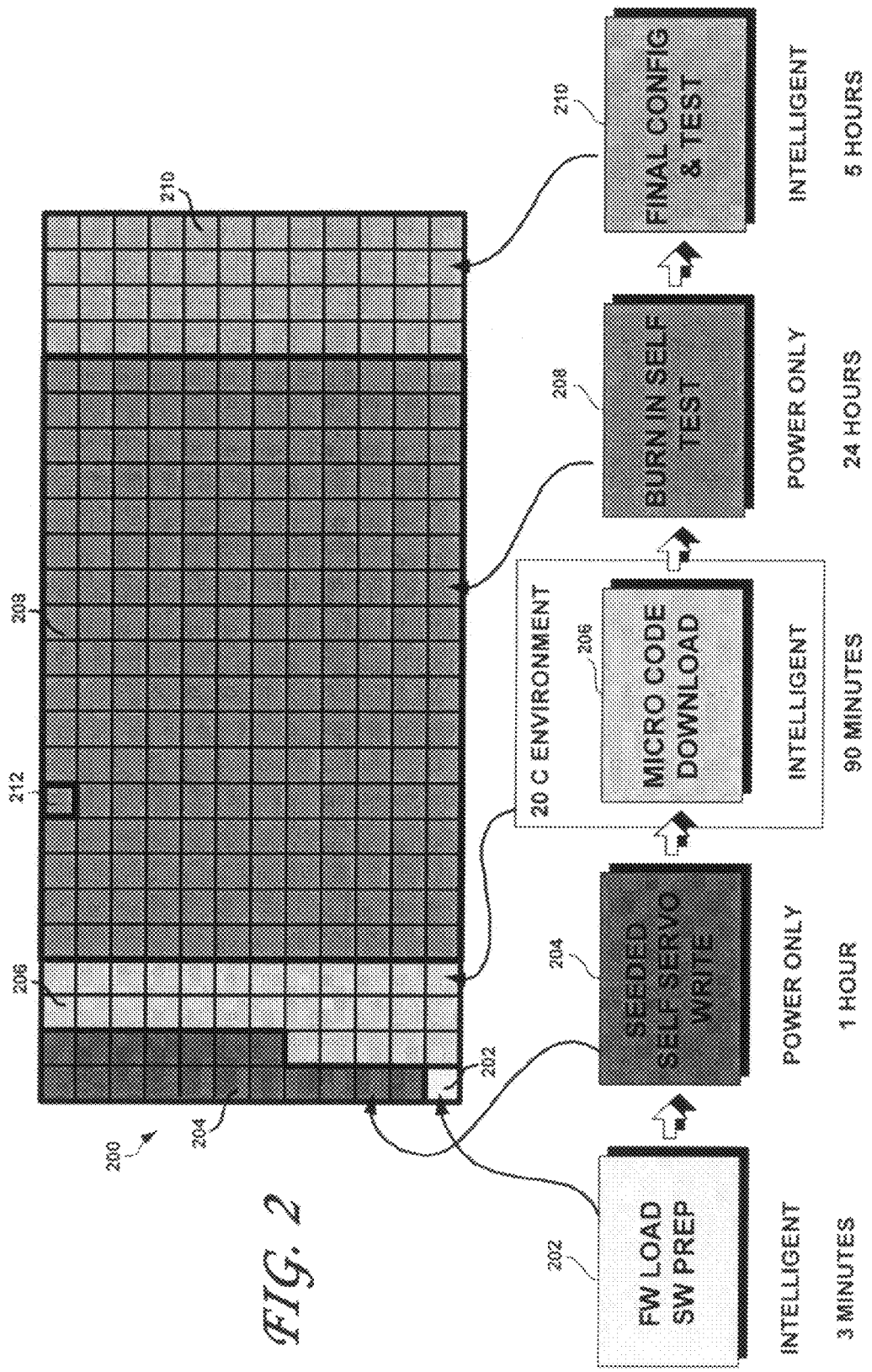
FIG. 2 is a functional diagram of a test wall for carrying out a sequential series of tests or procedures on disk drives, in which embodiments of the invention may be practiced.

FIG. 2 is a functional diagram of a test wall 200 for carrying out a sequential series of test or procedures on disk drives. As would be well understood by those skilled in the art, the term, disk drives, is used broadly herein, and may refer to hard disk drives (such as that shown in FIG. 1), optical disk drives, or others. As shown, the test wall 200 includes a plurality of cells, such as cell 212, into which the drives under test may be loaded and unloaded to administer a sequential series of tests or procedures on the drives. Each cell is configured to receive a disk drive under test (such as shown at 100 in FIG. 1) and provide communication between the drive under test and a host, such as a test computer discussed below. Also, as will be discussed in more detail below, each cell may include multiple slots or ports (e.g., two, three, four, etc.) such that multiple disk drives may be loaded into a single cell for testing by being loaded into respective slots of the cell. The plurality of cells 212 of the test wall 200 may be segregated into a plurality of groups. Each group of cells 212 may be configured to satisfy predetermined environmental (such as, for example, temperature, humidity, etc.), communication bandwidth and test schedule requirements of the drives under test to be loaded therein.

Underneath the test wall 200 of FIG. 2 is an exemplary series of sequential tests detailing the tests and procedures that may be sequentially carried out. For example, the groups of cells 212 may include a first group 202 of cells 212 dedicated to loading necessary firmware and software into the drives loaded therein. The approximate time required to carry out the tests and/or procedures on the drives under test are noted under each group, it being understood that these times are included herein for exemplary purposes only. As shown, the software and firmware loading in group 202 takes a comparatively short period of time, on the order of about three minutes. Also noted under each of the groups is the legend "Intelligent" or "Power Only", depending on whether the drives under test require communication with a host. Groups labeled "Intelligent" require that the drives under test loaded in the group communicate with a host, such as a test computer (discussed below), whereas groups labeled "Power Only" do not require communication with a host and require power only to complete the tests and/or procedures to be carried out within the group.

The next group 204 of cells 212 in the exemplary test wall shown in FIG. 2 supports a seeded self-servo write procedure, in which servo information is written to the disk or disks of the drives under test loaded therein. During this procedure, servo sector information may be written to the drive without using a servo track writer. As servo track writing is a time consuming process that is directly proportional to the aerial density of the disk, reducing the number of servo sectors the servo track writer lays down on the disk saves manufacturing time and costs. By reducing the number of servo sectors written by the servo track writer to, for example, every other servo sector and allowing the seeded self-servo write procedure carried out in the group 204 to interpolate between the written servo sectors, significant savings in both time and costs are achieved. In such a process, the servo track writer writes a number of reference tracks, and the seeded self-servo write procedure essentially performs an inbetweening process to write servo tracks between the reference tracks written by the servo track writer. Group 204 does not necessarily require communication with a host, as the software necessary to perform the seeded self-servo write may have been previously downloaded to the drive while the drive was loaded into one of the cells 212 of group 202.

The next group 206 of cells 212 supports microcode download, which is preferably carried out in an environmentally controlled environment, such as 20° C. As the microcode is downloaded from a host, communications between the drives under test loaded into the cells 212 of the group 206 and the host (a test computer) are necessary, hence the label "Intelligent" for group 206. The group having the largest number of cells 212 may be the group 208 in which the tests that take the longest time to complete are administered. Group 208 supports the initial burn in self-test OBI self-test), in which a lengthy calibration of the drives is performed, as well as procedures to discover, map and manage the defects on the media. The length of time necessary to complete this test is roughly proportional to the storage capacity of the drives under test.

The next and final group 210 of cells may be dedicated to administering final configurations and tests. This group 210 requires communication with a test computer, so as to verify the proper operation of host commands and to analyze and validate the results of the IBI self-test carried out in the group 208. Desired performance characteristics of a drive, such as head seek time, for example, may be verified within this group 210 of cells 212, if desired. It is understood that other tests and procedures may be carried out on the drives under test, in addition or in place of the tests discussed above, such as a debug process when a fault is found during testing. Such debug tests may be performed to isolate the fault, so as to facilitate the correction thereof. Of course, in other embodiments, the tests and procedures described above, or other tests and procedures need not be carried out sequentially on tested drives, and the test wall 200 may be configured to carry out a plurality of tests and procedures in any order.

Figure 3:
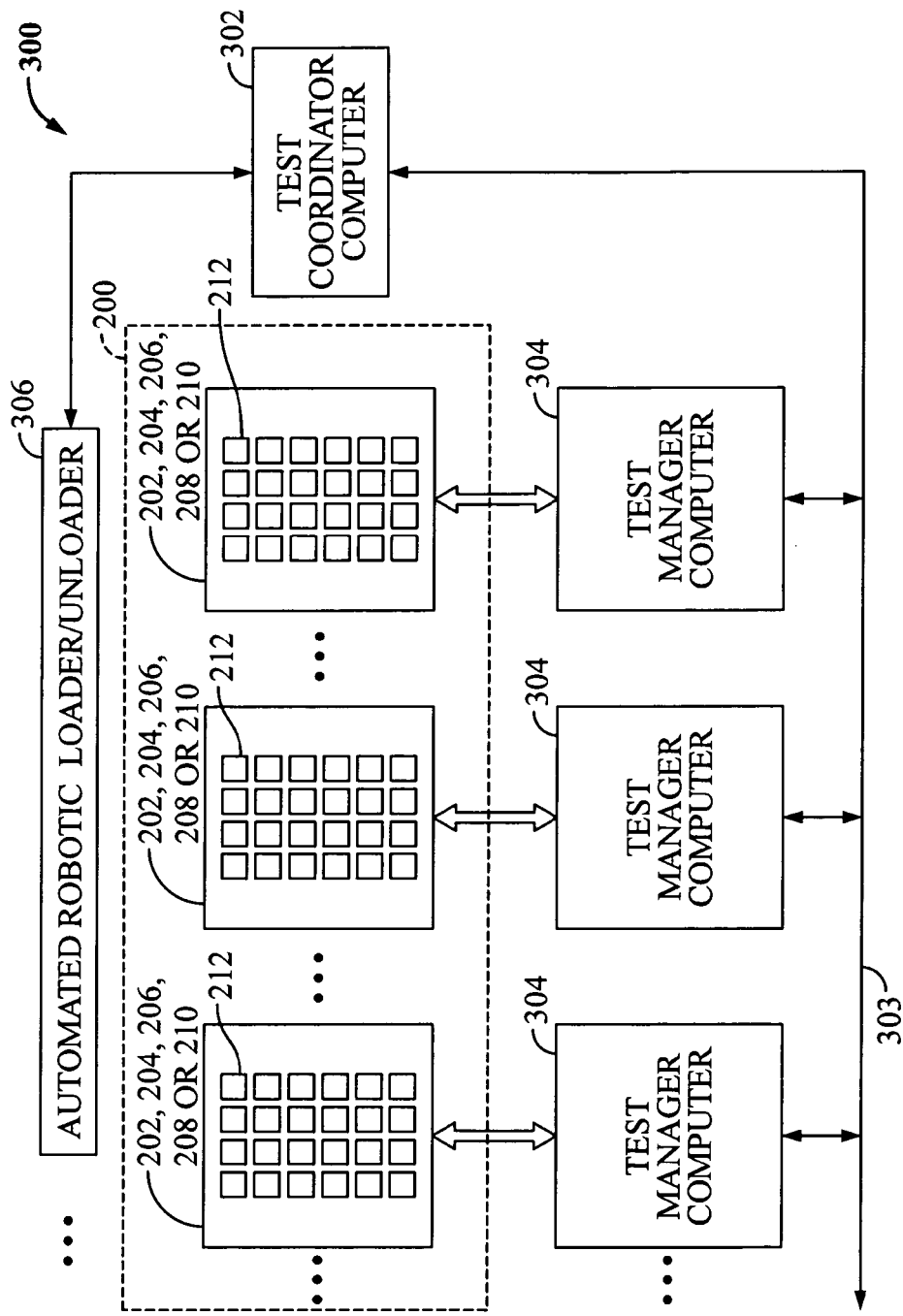
FIG. 3 is a diagram of an asynchronous multi-cell disk drive system for testing a plurality of disk drives utilizing the previously described test wall, in which embodiments of the invention related to disk drive grouping may be implemented.

FIG. 3 is a diagram of an asynchronous multi-cell disk drive system 300 for testing a plurality of disk drives utilizing the previously-described test wall, in which embodiments of the invention related to disk drive grouping may be implemented. The system includes the test platform 200 that has the plurality of cells 212, each cell 212 being configured to receive and to provide communication with a disk drive under test. As detailed above, the plurality of cells may be segregated into a plurality of groups 202, 204, 206, 208 or 210. Each group includes a particular type of physical interface and may be configured to satisfy predetermined environmental, communication bandwidth and test schedule requirements of the disk drives to be loaded therein to perform the varying types of previously-described tests. In one embodiment, each of the cells 212 may be self-contained with respect to environmental, communication bandwidth and test schedule requirements, thereby enabling any of the disk drives to be loaded into or unloaded from any of the cells 212 without affecting any of the other drives loaded in any of the other cells 212 and without affecting the testing or procedures carried out on the drives.

Multi-cell disk drive test system 300 may include an automated loader/unloader 306 that is configured to selectively load disk drives into and out of the test platform 200 and to move disk drives between cells of the plurality of groups. Portions of the system (such as the test wall 200) may be obtained from, for example, Xyratex International of San Jose, Calif.

According to one embodiment of the present invention, the automated loader/unloader 306 is robotic, and is coupled to and controlled by a computer, shown in FIG. 3 as test coordinator computer 302. The test coordinator computer 302 is aware of the current status of each disk drive under test within platform 200 through test manager computers 304 and further includes a database of disk drives available for testing (identified by the serial number of the disk drive). For each disk drive, the database may also include product attributes and test process attributes for each disk drive to be used for grouping criteria, which will be described later.

In one embodiment, the test coordinator computer 302 may issue commands that cause the automated loader/unloader to move the drives into and out of the platform 200, as well as between different cells and groups of cells. The test coordinator computer 302 may be coupled to the automated loader/unloader and to the test manager computers 304 via an Ethernet connection 303, for example. One or more test manager computers 304 may be assigned to each group 202, 204, 206, 208, or 210 of cells 212. In the illustrated example, one test manager computer 304 is assigned to a group of twenty-four cells. Each group has at least one test manager computer 304 assigned thereto and connected to its constituent cells 212.

Each test manager computer 304 is configured, according to one embodiment of the invention, to act as an I/O controller for the disk drives to which it is connected and to administer at least one test to the disk drives loaded in the cells 212 of its assigned group, all the while ensuring that the predetermined environmental, communication bandwidth and test schedule requirements of its assigned group remain satisfied.

Test coordinator computer 302 is coupled to and communicates with each test manager computer 304 and is also coupled to and controls the automated loader/unloader 306 as it moves disk drives under test into the test platform 200, out of the test platform, and between cells 212 and groups of cells (e.g., 202, 204, 206, 208, or 210).

Particularly, the automated loader/unloader 306 may include a robotic arm to selectively load and unload disk drives into and out of cells 212 responsive to test coordinator computer 302. Further, the automated loader/unloader 306 may include a disk drive scanner that scans a serial number associated with a disk drive. This serial number may be processed by test coordinator computer 302 and may serve as a basis for the type of grouping criteria to be employed and the type of test steps to be performed on the associated disk drive, as will be discussed.

The movement of each disk drive into, out of, and between groups 202, 204, 206, 208, or 210 of the test platform 200 may be carried out asynchronously by the automated loader/unloader 306. That is, the system need not wait for all disk drives loaded into the cells 212 of a given group to have finished the administered test in order to move the disk drives in batch mode out of the test platform or to cells of another group. Instead, as individual disk drives fail any test or procedure, pass a test or complete a procedure or complete an entire series of sequential tests, they may be moved asynchronously, as and when needed.

According to an embodiment of the present invention, test manager computers 304 may communicate with the drives under test loaded into the cells 212 according to the Serial Advanced Technology Architecture (ATA) point-to-point protocol. SATA is a widely used acronym for the serial ATA protocol. However, other serial and/or parallel protocols may be utilized. For example, other parallel interfaces and protocols such as, EIDE, PATA, etc, may be utilized as well as other types of serial interfaces and protocols such as, SCSI, Firewire, Fibre Channel, USB, SAS, etc. Also, both the test coordinator computer 302 and the test manager computers 304 may be or include personal computers (PCs) running, for example, a LINUX operating system or a MICROSOFT operating system, such as WINDOWS XP or WINDOWS 2000 PROFESSIONAL, for example.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a computer or processor readable medium or transmitted by a computer data signal embodied in a carrier wave, or a signal modulated by a carrier, over a transmission medium. The "processor readable or accessible medium" or "computer readable or accessible medium" may include any medium that can store, transmit, or transfer information. Examples of computer accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The computer accessible medium may include data that, when accessed by a computer, cause the computer to perform the operations described herein. The term "data" herein refers to any type of information that is encoded for machine-readable purposes. Therefore, it may include programs, code, data, files, etc.

All or portions of the embodiments of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 4:
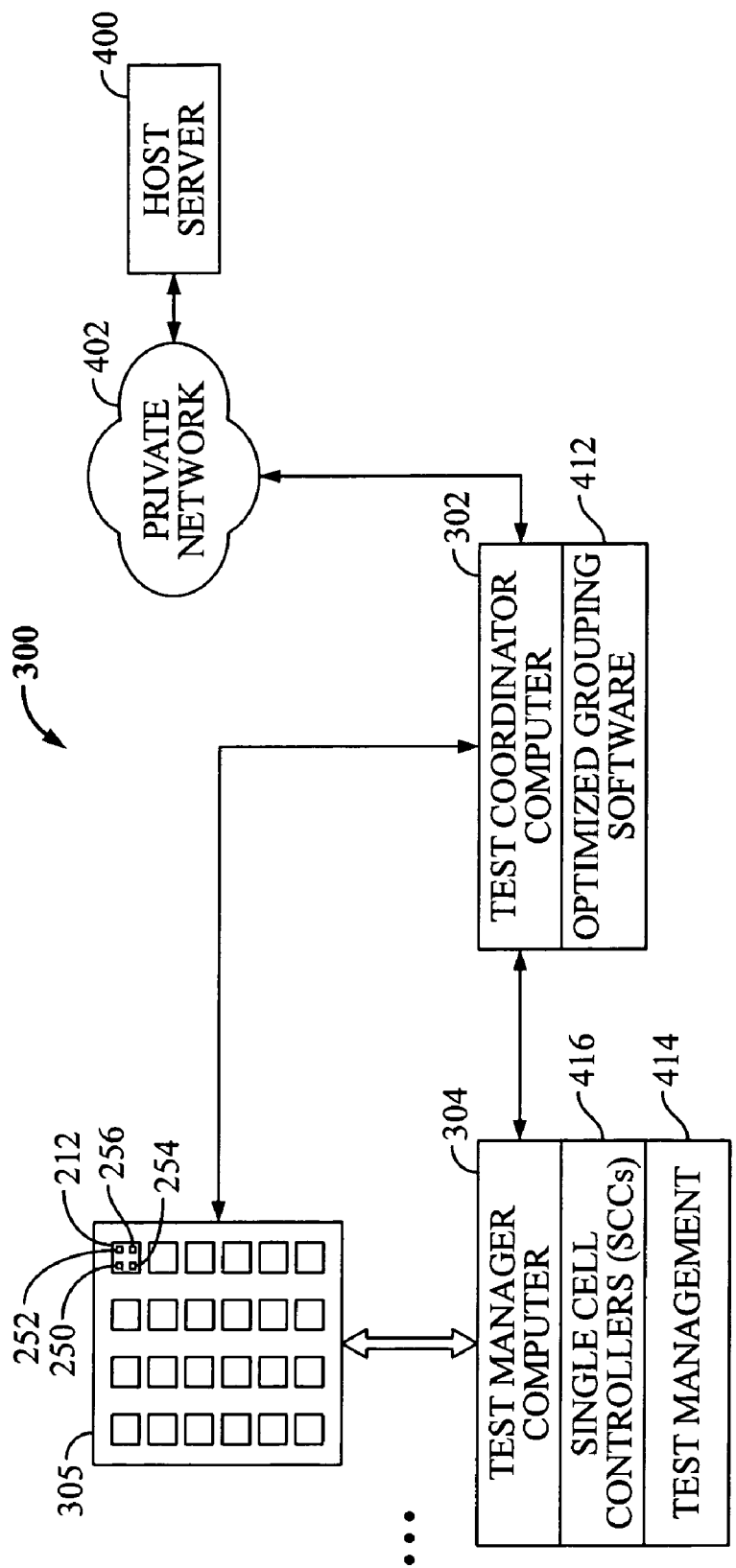
FIG. 4 is a block diagram illustrating more detailed aspects of a test manager computer and a test coordinator computer that provide for optimized disk drive grouping and for administering test steps to disk drives loaded into cells, according to one embodiment of the invention.

Turning now to FIG. 4, FIG. 4 is a block diagram illustrating more detailed aspects of the test manager computer 304 and the test coordinator computer 302 that provide for optimized disk drive grouping and for administering test steps to disk drives loaded into cells 212, according to one embodiment of the invention. As shown in FIG. 4, the multi-cell disk drive test system 300 includes the test manager computer 304, the test coordinator computer 302, and a plurality of cells 212.

As previously discussed, the test platform includes a plurality of cells 212, and each cell 212 has a particular type of physical interface and is configured to receive and to provide communication with a disk drive loaded therein. In one embodiment, the plurality of cells may be segregated into a plurality of groups based upon the type of physical interface of the cell.

A test manager computer 304 may be assigned to each group of cells—illustrated here as group of cells 305. Test manager computer 304 is coupled to the assigned group of cells 305 to administer at least one of a plurality of tests steps to the disk drives loaded in the assigned group of cells 305. In one embodiment, the group of cells may comprise a single cell 212.

In this example, test manager computer 304 includes a test management software module 414 and at least one single cell controller 416. Test management software module 414 controls the general operations of the test manager computer 304 in performing its testing operations, including the control of test steps to be performed on the disk drives loaded in the cells in conjunction with the single cell controllers (SCCs) 416. Each cell has an assigned SCC 416, and the assigned SCC controls the test step operation for the assigned cell to perform the desired test step on the disk drive loaded in the assigned cell.

Test coordinator computer 302 is configured to communicate with each test manager 304 (only one shown) and to detect subsequent disk drives having the same grouping criteria as a first identified disk drive and to cause the automated loader/unloader to load subsequent disk drives into and out of the cells. Test coordinator computer 302 also provides coordination functionality between the various test manager computers 304, and may also perform other functions, such as ensuring that the test manager computers have updated software modules for various tests.

Particularly, in one embodiment, test coordinator computer 302 in conjunction with the automated loader/unloader identifies a first disk drive by a serial number and loads the first disk drive into a cell 212. In one particular embodiment, test coordinator computer 302 may implement optimized grouping software module 412 that is utilized to determine grouping criteria based upon the identification of the first disk drive by the test coordinator computer 302 and the automated loader/unloader.

Test coordinator computer 302 may be aware of the current status of each disk drive under test within platform 200 through test manager computers 304 and further includes a database of disk drives available for testing (identified by the serial number of the disk drive). For each disk drive, the database may also include product and test process attributes for each disk drive, which will be described later.

Next, test coordinator computer 302 in conjunction with the automated loader/unloader detects a subsequent disk drive having the same grouping criteria as the first disk drive and the automated loader/unloader loads the subsequent disk drive into one of the plurality of cells 212.

For example, test coordinator computer 302 and the automated loader/unloader may continue to successively detect subsequent disk drives having the same grouping criteria as the first disk drive and continue to load them into cells 212 until there are no more disk drives available having the same grouping criteria, or until a pre-determined period of time has expired without the test coordinator computer detecting another subsequent disk drive with the same grouping criteria as the first disk drive.

Then, with the first and subsequent disk drives loaded into appropriate cells 212, the test manager computer 304 administers the appropriate test steps to the first and subsequent disk drives having the same grouping criteria. In this way, these disk drives with the same grouping criteria can be efficiently tested at the same time. Examples of different grouping criteria will be discussed hereinafter.

In one embodiment, a cell 212 may include at least two ports such that at least a first and a second disk drive may be loadable in each of the ports, respectively. As shown in FIG. 4, a cell 212 may include ports 250, 252, 254, and 256, so that up to four disk drives may be loadable into the cell 212. The test manager computer 304 may then administer the test steps to each of the disk drives loaded into each of the ports 250, 252, 254, 256 of the cell 212.

Based on a grouping criteria of the first disk drive, multiple subsequent disk drives may be respectively loaded into ports of a single cell as well as in the ports of other cells and/or into individual cells as long as they have the same identified grouping criteria as the first disk drive. This may significantly increase the number of disk drives that are simultaneously tested. An example of a cell having multiple ports is disclosed in the Assignee's co-pending patent application Ser. No. 11/190,281, entitled "MULTI-DRIVE ADAPTOR FOR USE IN A SLOT OF A DISK DRIVE TEST SYSTEM," to Pakzad et al., hereby incorporated by reference in its entirety.

Thus, after the disk drives are loaded into appropriate cells and/or ports of appropriate cells, the test manager computer 304, utilizing test management software module 414 and SCCs 416, may administer test steps on the first and subsequent disk drives having the same grouping criteria loaded therein. Test steps may relate to previously-described test procedures associated with firmware and software loading, servo-writing, initial burn-in and self testing, configuration testing, etc.

As will be discussed, the grouping criteria may include one of a product attribute of the first disk drive or a process attribute of the associated test step.

It should be appreciated that the test manager computer and the SCCs 416 may selectively communicate with each of the cells 212 and each of the ports 250, 252, 254, and 256 of the cells 212 over a parallel or serial connection and by one of a serial or parallel protocol. Further, each cell 212 and/or each port of each cell may be configured to selectively communicate with the disk drive loaded therein over a serial or parallel interface or connection. Examples of parallel interfaces include EIDE or parallel ATA (PATA). Examples of serial interfaces include SATA, SAS, and USB.

Additionally, as shown in FIG. 4, a host server 400 may store a plurality of software modules that may be transmitted through a network 402 to the test coordinator computer 302 and test manager computer 304. The network 402 may be a private network, such as a local area network (LAN) or even a wide area network (WAN), and various software modules may be specific to particular disk drive manufactures. It should also be appreciated that instead of a private network, a public network, such as the Internet, may be utilized.

The host server 400 may push updated versions of the software modules through the private network 402 for storage on the test coordinator computer 302 and the test manager computer 304. It should be appreciated that all of the cells 212 associated with the same test manager computer 304 should preferably have the same version of the appropriate software modules.

It is noted that an embodiment of the invention may be described as a process, which is usually depicted as a flow chart, a flow diagram, a structure diagram, or a block diagram. Although a flow chart may describe the operations of the sequential process, many of the operations can be performed in parallel or concurrently. In addition, the order of the operation may be re-arranged. A process is terminated when its operations are completed. A process may correspond to a method, a function, a procedure, a subroutine, a subprogram, etc. When a process corresponds to a function, its termination corresponds to a return of the function to the calling function or the name function.

Figure 5:
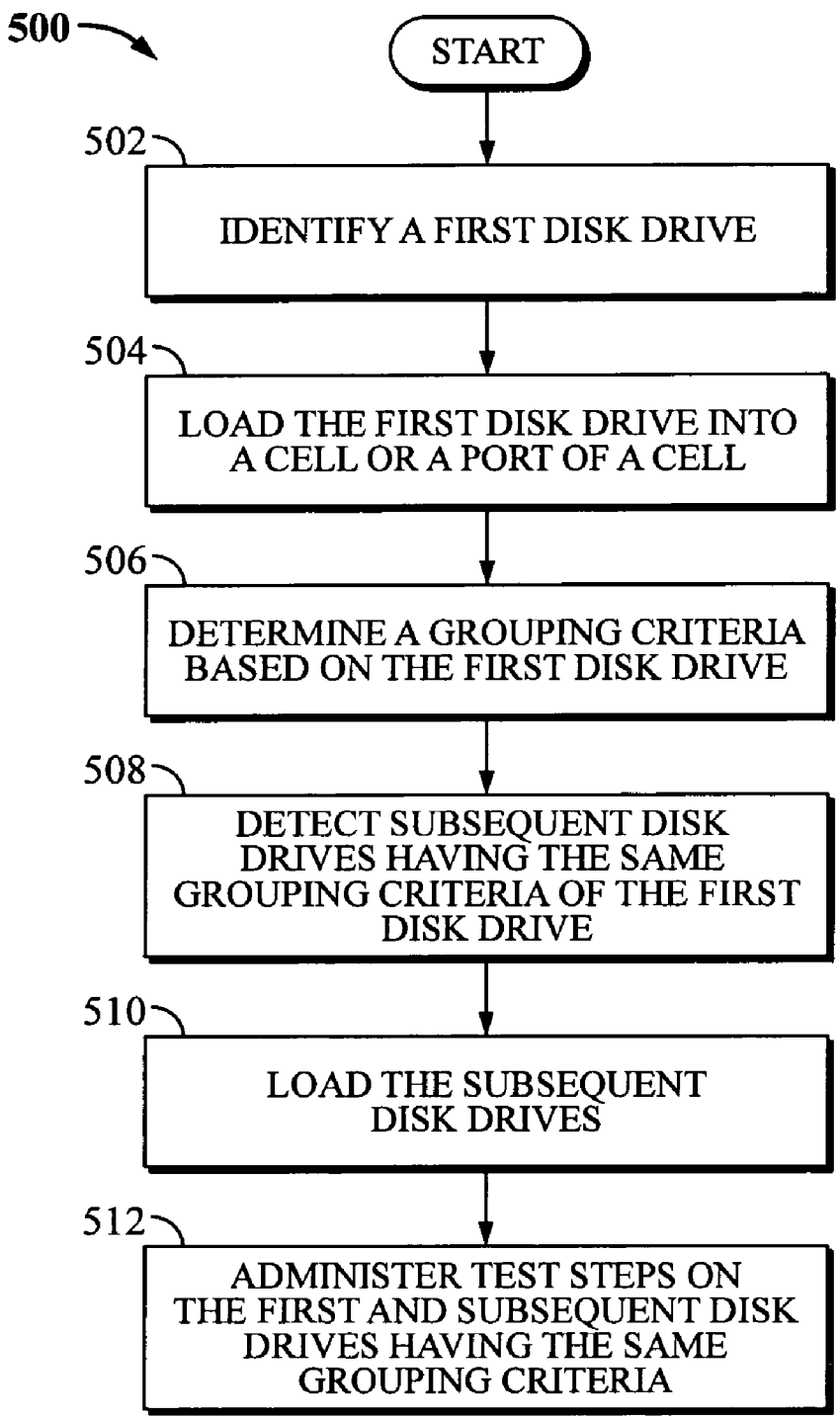
FIG. 5 shows a flow diagram illustrating a process to implement optimized disk drive grouping in a multi-cell disk drive test system, according to one embodiment of the invention.

Turning now to FIG. 5, FIG. 5 shows a flow diagram illustrating a process 500 to implement optimized disk drive grouping in a multi-cell disk drive test system, according to one embodiment of the invention.

After start, at block 502, a first disk drive is identified. For example, the first disk drive may be identified by a serial number scanned by the multi-cell disk drive test system, as previously discussed. After identification of the first disk drive, the first disk drive is loaded into a cell or a port of a cell (block 504). A grouping criteria is then determined based on the first disk drive (block 506).

Subsequent disk drives are then detected that have the same grouping criteria as that of the first disk drive (block 508). The subsequent disk drives are then loaded into cells or ports of cells in the multi-cell disk drive test system (block 510). Test steps are then administered on the first and subsequent disk drives having the same grouping criteria (block 512). In this way, disk drives with the same grouping criteria can be efficiently tested at the same time.

As has been previously discussed, grouping criteria may be based on at least one of a product attribute of the first disk drive or a process attribute associated with the test step to be performed. For example, the product attribute of the first disk drive may relate to the storage capacity of the first disk drive or the number of heads of the first disk drive. On the other hand, a process attribute of the test step to be performed may be, for example, an operation type associated with the test step or a software type associated with the test step.

Turning to FIG. 6, FIG. 6 is a table illustrating examples of different types of grouping criteria based on product attributes or process attributes. For example, disk drives may be grouped based upon a product attribute 602. Examples of these product attributes include the buffer size of the cache of the disk drive 604, the number of heads of the disk drive 606, the family ID of the disk drive 608, the storage capacity of the disk drive 610 (e.g., typically related to the number of disks of the disk drive), the revolutions per minute (RPM) of the disk drive 612, and the interface protocol of the disk drive 614 (e.g., SATA, PATA, SCSI, etc.).

On the other hand, grouping criteria may be based upon the process attributes 603 of the test steps to be performed on the disk drives. These may include the operation type 620 (e.g., firmware loading, software loading, servo-writing, initial burn-in and self testing, configuration testing, etc.), the type of customer 624 of the disk drive (e.g., hard disk drives for personal computers versus server computers), the software module 626 associated with the operation to be performed, and the software module version 628.

Figure 7A:
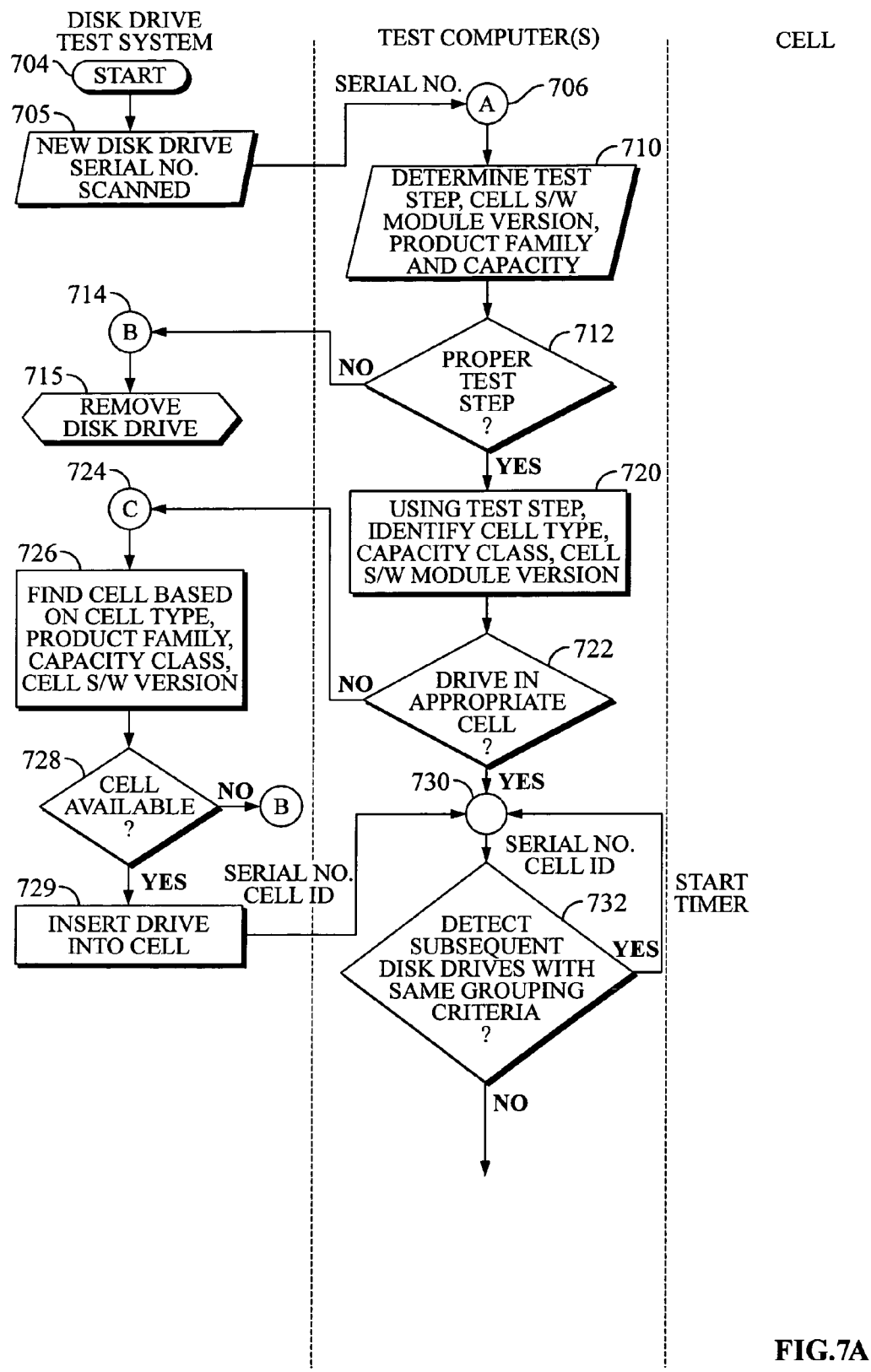
FIGS. 7A and 7B are flow diagrams illustrating a process to implement optimized disk drive grouping in a multi-cell disk drive test system, according to one embodiment of the invention.
Figure 7B:
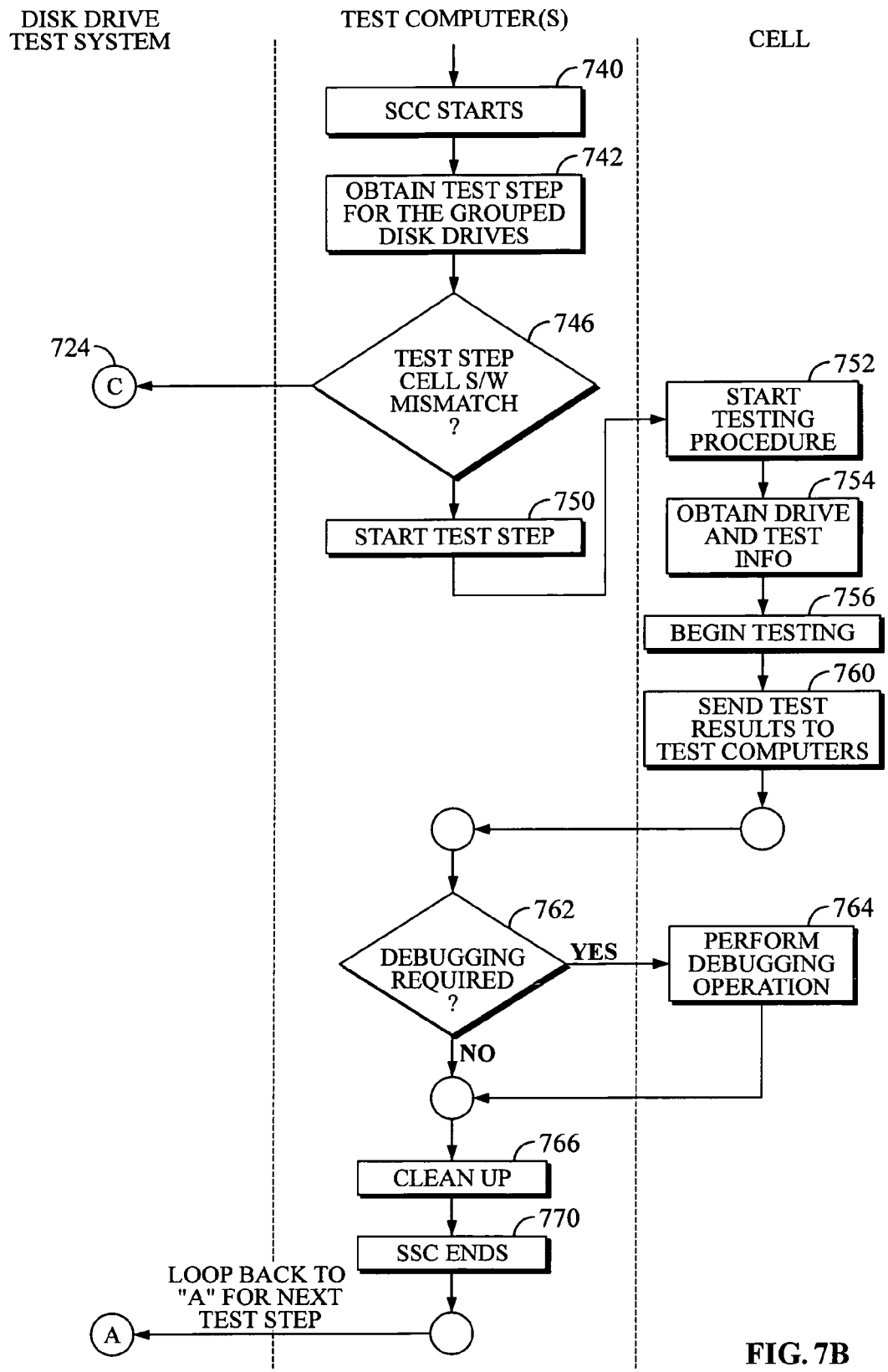

Turning now to FIGS. 7A and 7B, FIGS. 7A and 7B show a flow diagram illustrating a process to implement optimized disk drive grouping in a multi-cell disk drive test system, according to one embodiment of the invention. As shown in FIGS. 7A and 7B, different method or process steps may be performed by one of the multi-cell disk drive test system, test computers, or a cell. It should be appreciated that either test manager computer 304 or test coordinator computer 302 can accomplish particular functions to be hereinafter described, however, for illustrative purposes one or the other will be particularly described as carrying out the function.

After start 704, at block 705, a new first disk drive is scanned (e.g., utilizing the automatic robotic loader/unloader), as previously discussed. After receipt of the serial number at circle A 706, a test computer, such as test coordinator computer, commands the loading of the disk drive into a cell or a port of a cell and determines the disk drive test step required to be performed on the disk drive, a cell software module version number, the product family of the disk drive, and the capacity of the disk drive (block 710). At decision block 712, the test coordinator computer determines whether or not the proper test step is being requested to be performed. If not, the process moves to circle B 714 and the disk drive is removed at block 715. Previously described automated robotic loader/unloader may be utilized for this purpose.

If the proper test step is being requested, using the test step, the test coordinator computer identifies the cell type, the capacity class, and the cell software module version (block 720). At decision block 722, the test coordinator computer determines if the disk drive is in the appropriate cell. If so, the process moves to process point 730 which will be described later.

If not, the process moves to circle C 724 and the multi-cell disk drive test system attempts to find a cell for the disk drive based upon cell type, product family, capacity class, or cell software version that is compatible for the disk drive (block 726). At decision block 728, if a cell is not available, the process moves to circle B 714 and the disk drive is removed at (block 715). However, if a cell is available for the disk drive, then the multi-cell disk drive test system inserts the disk drive into the cell and obtains the serial number and cell ID (block 729). Previously described automated robotic loader/unloader may be utilized for this purpose.

With the serial number and cell ID obtained for the first disk drive, at process point 730, the test coordinator computer attempts to detect subsequent disk drives having the same grouping criteria as the first disk drive. This step, as shown in FIG. 7A, may occur for a pre-determined time period based upon a timing operation. For example, the test coordinator computer may search a database of the disk drives available for testing by the multi-cell disk drive test system, in which disk drives may be identified by their serial numbers. For each disk drive, the database may also include previously described grouping criteria as to such items as product attributes (e.g., cache buffer size, number of heads, family ID, storage capacity, RPM, interface protocol) and process attributes (e.g., operation type, customer, software module, software version).

Based upon these entries, the test computer may detect subsequent disk drives having the same grouping criteria as the first disk drive and will cause the automated loader/unloader to load these subsequent disk drives into cells and/or ports of cells of the same group such that they can be efficiently tested at the same time. However, after a pre-determined time period has expired, and the test coordinator computer has not detected subsequent disk drives having the same grouping criteria, the process moves forward, and the test steps are then administered to the first and subsequent disk drive having the same grouping criteria.

Moving to block 740, the single cell controller(s) (SCC(s)) of the test manager computer begin disk drive testing operations. First, the test manager computer obtains a test step for the grouped disk drives (block 742). At decision block 746, it is determined whether there is a test step-cell software mismatch. If so, then the process moves to circle C 724 and restarts the previously described process starting at block 726.

However, if there is not a test step-cell software mismatch, then the test step is started at block 750.

Particularly, at block 752, the disk drive test procedure or step is started. This includes obtaining disk drive and test information (block 754) and beginning the testing of the disk drives at block 756. After testing is complete, the test results are sent back to the test computers (e.g. the test manager computer and the test coordinator computer) at block 760.

Next, at decision block 762, it is determined whether debugging is required. If so, the debugging operations are performed at 764. After debugging, or if debugging is not required, clean up is then performed (block 766), and the testing ends (block 770). The process then loops back to circle A 706. In this way, multiple disk drives in cells or ports of cells having the same grouping criteria can be efficiently tested.

By utilizing the previously-described process to provide optimized disk drive grouping in a multi-cell disk drive test system, disk drives are grouped together during pre-defined time intervals based upon common grouping criteria such that the cells and ports of cells of multi-cell disk drive test system are efficiently utilized, and overall disk drive testing time is decreased. This may result in a great deal of cost savings.

It should be appreciated by those with skill in this art that, although embodiments of the invention have been previously described with reference to particular test computers and software modules, embodiments of the invention may be utilized in a wide variety of differing multi-cell disk drive test systems utilizing various types of computers, test equipment, software, firmware, interfaces, etc.

We claim:

1. A method for providing disk drive grouping in a multi-cell disk drive test system comprising a test platform that includes a plurality of cells, each cell being configured to receive and to provide communication with a disk drive, such that at least one of a plurality of test steps is administered to the disk drive, the method comprising:
   identifying a first disk drive;
   determining a grouping criteria associated with the first disk drive;
   loading the first disk drive into a cell of a test platform;
   detecting a subsequent disk drive that is identified as having the same grouping criteria as the first disk drive;
   loading the subsequent disk drive into the test platform; and
   administering at least one test step to the first and subsequent disk drives having the same grouping criteria.

2. The method of claim 1, wherein detecting the subsequent disk drive is limited to a pre-determined time period, and, after the pre-determined time period expires, the at least one test step is administered to the first and subsequent disk drives having the same grouping criteria.

3. The method of claim 1, wherein the cell includes at least two ports such that at least the first and subsequent disk drives are each loadable in one of the at least two ports, respectively, such that the at least one test step is administered to at least the first and subsequent disk drives.

4. The method of claim 1, wherein the grouping criteria includes one of a product attribute of the first disk drive or a process attribute of the at least one test step.

5. The method of claim 1, wherein the product attribute of the first disk drive includes at least one of a capacity of the first disk drive or a head number of the first disk drive.

6. The method of claim 4, wherein the process attribute of the at least one test step includes at least one of an operation type of the at least one test step or a software type associated with the at least one test step.

7. The method of claim 1, wherein identifying the first disk drive further comprises scanning a serial number associated with the first disk drive.

8. The method of claim 1, wherein the plurality of test steps are selectively communicated to one of the plurality of cells via one of a serial or parallel protocol.

9. A multi-cell disk drive test system used for testing a plurality of disk drives comprising a computer and a test platform, the test platform including a plurality of cells, each cell being configured to receive and to provide communication with a disk drive such that at least one of a plurality of test steps are administered to the disk drive, wherein the computer is operable to perform operations comprising:
   identifying a first disk drive;
   determining a grouping criteria associated with the first disk drive;
   detecting a subsequent disk drive having the same grouping criteria as the first disk drive; and
   administering at least one test step to the first and subsequent disk drives having the same grouping criteria.

10. The multi-cell disk drive test system of claim 9, further comprising instructions that cause the computer to perform the operations comprising limiting the detection step to a pre-determined time period, and causing the at least one test step to be administered to the first and subsequent disk drives after the pre-determined time period expires.

11. The multi-cell disk drive test system of claim 9, wherein a cell includes at least two ports such that at least the first and subsequent disk drives are each loadable in each one of the at least two ports, respectively, such that the at least one test step is administered to at least the first and subsequent disk drives.

12. The multi-cell disk drive test system of claim 9, wherein the grouping criteria includes one of a product attribute of the first disk drive or a process attribute of the at least one test step.

13. The multi-cell disk drive test system of claim 12, wherein the product attribute of the first disk drive includes at least one of a capacity of the first disk drive or a head number of the first disk drive.

14. The multi-cell disk drive test system of claim 12, wherein the process attribute of the at least one test step includes at least one of an operation type of the at least one test step or a software type associated with the at least one test step.

* * * * *